United States Patent
Leleannec et al.

(10) Patent No.: US 12,284,344 B2
(45) Date of Patent: Apr. 22, 2025

(54) DEEP LEARNING BASED IMAGE PARTITIONING FOR VIDEO COMPRESSION

(71) Applicant: INTERDIGITAL VC HOLDINGS, INC., Wilmington, DE (US)

(72) Inventors: Fabrice Leleannec, Cesson-Sevigne (FR); Franck Galpin, Cesson-Sevigne (FR); Sunil Jaiswal, Rennes (FR); Fabien Racape, Palo Alto, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/771,105

(22) PCT Filed: Dec. 12, 2018

(86) PCT No.: PCT/US2018/065079
§ 371 (c)(1),
(2) Date: Jun. 9, 2020

(87) PCT Pub. No.: WO2019/118539
PCT Pub. Date: Jun. 20, 2019

(65) Prior Publication Data
US 2020/0344474 A1    Oct. 29, 2020

(30) Foreign Application Priority Data

Dec. 14, 2017  (EP) ..................................... 17306773
Jan. 26, 2018  (EP) ..................................... 18305069
Jan. 26, 2018  (EP) ..................................... 18305070

(51) Int. Cl.
*H04N 19/119* (2014.01)
*G06N 3/08* (2006.01)
(Continued)

(52) U.S. Cl.
CPC ............. *H04N 19/119* (2014.11); *G06N 3/08* (2013.01); *H04N 19/105* (2014.11); *H04N 19/176* (2014.11); *H04N 19/96* (2014.11)

(58) Field of Classification Search
CPC .. H04N 19/119; H04N 19/105; H04N 19/176; H04N 19/96; G06N 3/08; G06N 3/0454; G06T 9/002
See application file for complete search history.

(56) References Cited

U.S. PATENT DOCUMENTS 8,515,193 B1 *  8/2013  Han .................... G06K 9/6219
                                                    382/238
8,665,951 B2    3/2014  Ameres et al.
(Continued)

FOREIGN PATENT DOCUMENTS

CN     100479527        4/2009
CN     101789124 A      7/2010
(Continued)

OTHER PUBLICATIONS

IEEE Transactions on Image Processing, vol. 25, No. 11, Nov. 2016 CU Partition Mode Decision for HEVC Hardwired Intra Encoder Using Convolution Neural Network Zhenyu Liu, Member, IEEE, Xianyu Yu, Yuan Gao, Shaolin Chen, Xiangyang Ji, Member, IEEE, and Dongsheng Wang, Member, IEEE (Year: 2016).*
(Continued)

*Primary Examiner* — Nasim N Nirjhar
(74) *Attorney, Agent, or Firm* — Condo Roccia Koptiw LLP

(57) ABSTRACT

A block of video data is split using one or more of several possible partition operations by using the partitioning choices obtained through use of a deep learning-based image partitioning. In at least one embodiment, the block is split in one or more splitting operations using a convolutional neural network. In another embodiment, inputs to the convolutional
(Continued)

neural network come from pixels along the block's causal borders. In another embodiment, boundary information, such as the location of partitions in spatially neighboring blocks, is used by the convolutional neural network. Methods, apparatus, and signal embodiments are provided for encoding.

19 Claims, 25 Drawing Sheets

(51) Int. Cl.
   *H04N 19/105* (2014.01)
   *H04N 19/176* (2014.01)
   *H04N 19/96* (2014.01)

(56) References Cited

U.S. PATENT DOCUMENTS

| | | |
|---|---|---|
| 9,706,219 B2 | 7/2017 | Henry et al. |
| 9,883,203 B2 | 1/2018 | Chien et al. |
| 10,057,586 B2 | 8/2018 | Gu et al. |
| 10,708,589 B2 | 7/2020 | Mishurovskiy et al. |
| 2004/0165765 A1 | 8/2004 | Sung et al. |
| 2015/0189269 A1 | 7/2015 | Han et al. |
| 2016/0065959 A1* | 3/2016 | Stobaugh ............... H04N 19/14 375/240.26 |
| 2016/0065964 A1 | 3/2016 | Zhang et al. |
| 2016/0134857 A1 | 5/2016 | An et al. |
| 2016/0174902 A1 | 6/2016 | Georgescu et al. |
| 2017/0118486 A1 | 4/2017 | Rusanovskyy |
| 2017/0214913 A1 | 7/2017 | Zhang et al. |
| 2017/0280144 A1* | 9/2017 | Dvir .................. G06T 3/602 |
| 2018/0089493 A1* | 3/2018 | Nirenberg ............ G06K 9/4628 |
| 2018/0227585 A1* | 8/2018 | Wang .................. H04N 19/503 |
| 2019/0007686 A1 | 1/2019 | Galpin et al. |
| 2019/0166380 A1* | 5/2019 | Chen .................... H04N 19/176 |
| 2019/0230354 A1* | 7/2019 | Kim ....................... G06F 17/15 |
| 2020/0145661 A1* | 5/2020 | Jeon .................... H04N 19/136 |
| 2021/0150767 A1* | 5/2021 | Ikai ..................... H04N 19/159 |

FOREIGN PATENT DOCUMENTS

| | | |
|---|---|---|
| CN | 103999465 A | 8/2014 |
| CN | 104041039 | 9/2014 |
| CN | 106162167 A | 11/2016 |
| CN | 106464855 A | 2/2017 |
| CN | 106651886 A | 5/2017 |
| CN | 107197260 A | 9/2017 |
| FR | 3035760 A1 | 11/2016 |
| JP | 2017-155903 * | 8/2017 |
| KR | 10-2017-0059040 A | 5/2017 |
| TW | 201724853 | 7/2017 |
| WO | 2010/039731 A2 | 4/2010 |
| WO | 2015/006884 A1 | 1/2015 |
| WO | 2015/142070 A1 | 9/2015 |
| WO | 2015/190839 A1 | 12/2015 |
| WO | 2015/200820 A1 | 12/2015 |
| WO | WO-2019009449 A1 * | 1/2019 |

OTHER PUBLICATIONS

Liu et al., CU Partition Mode Decision for HEVC Hardwired Intra Encoder Using Convolution Neural Network, IEEE Transactions on Image Processing IEEE Service Center, vol. 25, No. 11, Nov. 1, 2016, pp. 5088-5103.

Li et al., A Deep Convolutional Neural Network Approach for Complexity Reduction on Intra-Mode HEVC, 2017 IEEE International Conference on Multimedia and Expo (ICME), IEEE, Jul. 10, 2017, pp. 1255-1260.

Ruiz et al., Fast CU Partitioning Algorithm for HEVC Intra Coding Using Data Mining, Multimedia Tools and Applications, vol. 76, No. 1, 861-94, (2017).

Jin et al., CNN Oriented Fast QTBT Partition Algorithm for JVET Intra Coding, 2017 IEEE Visual Communications and Image Processing (VCIP), IEEE, Dec. 10, 2017, pp. 1-4.

Laude et al. Deep Learning-Based Intra Prediction Mode Decision for HEVC, 2016 Picture Coding Symposium (PCS), IEEE, Dec. 4, 2016, pp. 1-5.

Galpin et al., AHG9: CNN-Based Driving of Block Partitioning for Intra Slices Encoding, 10. JVET Meeting, Oct. 4, 2018-Apr. 20, 2018, San Diego, (The Joint Video Exploration Team of ISO/IEC JTC1/SC29/WG11 and ITU-T SG.16), URL:http://phenix.int-evry.fr/jvet, No. JVET-J0034, Apr. 3, 2018.

Jie et al., Content Based Hierarchical Fast Coding Unit Decision Algorith for HEVC, Multimedia and Signal Processing (CMSP), 2011 International Conference on, IEEE, May 14, 2011, pp. 56-59.

Xiaolin et al., CU Splitting Eady Termination Based on Weighted SVM, Eurasip Journal on Image and Video Processing, vol. 2013, No. 1, Jan. 1, 2013, p. 4.

Cassa et al.. Fast Rate Distortion Optimization for the Emerging HEVC Standard, 2012 Picture Coding Symposium, May 7-9, 2012, Krakow, Poland.

Sun et al., Efficient coding unit partition strategy for HEVC intracoding, Journal of Electronic Imaging, vol. 26, No. 4, pp. 043023-1-043023-8, (Jul./Aug. 2017).

ITU-T, "Advanced Video Coding for Generic Audiovisual Services", Recommendation H.264, Series H: Audiovisual and Multimedia Systems, Infrastructure of Audiovisual Services—Coding of Moving Video, Feb. 2014, 790 pages.

ITU-T, "High Efficiency Video Coding", Recommendation H.265, Series H: Audiovisual and Multimedia Systems, Infrastructure of Audiovisual Services—Coding of Moving Video, Oct. 2014, 540 pages.

CN 106162167 (A) Cited in Office Action dated Oct. 11, 2023, in related Chinese Patent application No. 201880080429.2.

CN 107197260 (A) Cited in Office Action dated Oct. 11, 2023, in related Chinese Patent application No. 201880080429.2.

Chen et al., "Algorithm description of Joint Exploration Test Model 7 (JEM7)", JVET-G1001, Aug. 19, 2017.

Leannec et al., "Asymmetric Coding Units in QTBT", JVET-D0064, Technicolor, Joint Video Exploration Team (JVET) of ITU-T SG 16 WP 3 and ISO/IEC JTC 1/SC 29/WG 11, 4th Meeting: Chengdu, CN, Oct. 15-21, 2016, 10 pages.

Li et al., "Multi-Type-Tree", JVET-D0117, Qualcomm Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, 3 pages.

Shen et al., "CU Splitting Early Termination Based on Weighted SVM", Eurasip Journal on Image and Video Processing, vol. 2013, No. 4, 2013, 11 pages.

CN 101789124 (A), Cited in notice of allowance dated Aug. 1, 2024 in related Chinese Patent Application No. 201880080802.4.

CN 106651886 (A), Cited in Office Action dated May 15, 2024 in related Chinese Patent Application No. 201880080429.2.

FR 3035760 (A1), Cited in Office Action dated May 15, 2024 in related Chinese Patent Application No. 201880080429.2.

KR 10-2017-0059040 (A), Cited in notice of allowance dated Aug. 1, 2024 in related.

WO 2015/142070 (A1), U.S. Pat. No. 10,708,589 (B2).

* cited by examiner

HOR_TRIPLE     VER_TRIPLE

DEEP LEARNING BASED IMAGE PARTITIONING FOR VIDEO COMPRESSION

FIELD OF THE INVENTION

The present principles relate to the field of video compression.

BACKGROUND OF THE INVENTION

In the HEVC video compression standard (International Telecommunication Union, ITU-T H.265 High Efficiency Video Coding), a picture is divided into so-called Coding Tree Units (CTU), whose size is typically 64×64, 128×128, or 256×256 pixels.

Each CTU is represented by a Coding Tree in the compressed domain. This is a quad-tree division of the CTU, where each leaf is called a Coding Unit (CU), as shown in FIG. 1.

Each CU is then given some Intra or inter prediction parameters (Prediction Info). To do so, it is spatially partitioned into one or more Prediction Units (PUs), each PU being assigned some prediction information. The Intra or Inter coding mode is assigned on the CU level, see FIG. 2.

The Partitioning of a Coding Unit into Prediction Unit(s) is done according to the partition type, signaled in the bit-stream. For Intra coding unit, only the partition types 2N×2N and N×N, illustrated in FIG. 3, are used. This means only square Prediction Units are used in Intra Coding Units.

On the contrary, Inter Coding Units can use all partition types shown in FIG. 3.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain, proposed in order to represent picture data in a more flexible way in the compressed domain. The advantage of this flexible representation of the coding tree is that it provides increased compression efficiency compared to the CU/PU/TU arrangement of the HEVC standard.

The Quad-Tree plus Binary-Tree (QTBT) coding tool provides this increased flexibility. It consists in a coding tree where coding units can be split both in a quad-tree and in a binary-tree fashion. Such coding tree representation of a Coding Tree Unit is illustrated in FIG. 4. The QTBT representation on a block is illustrated in FIG. 5.

The splitting of a coding unit is decided on the encoder side through a rate distortion optimization procedure which consists in determining the QTBT representation of the CTU with minimal rate distortion cost.

In the QTBT technology, a CU has either square or rectangular shape. The size of coding unit is always a power of 2, and typically goes from 4 to 256.

In addition to this variety of rectangular shapes for a coding unit, this new CTU representation has the following different characteristics compared to HEVC.

First, the QTBT decomposition of a CTU is made of two stages: first the CTU is split in a quad-tree fashion, then each quad-tree leaf can be further divide in a binary fashion. This is illustrated on the right of FIG. 4 where solid lines represent the quad-tree decomposition phase and dashed lines represent the binary decomposition that is spatially embedded in the quad-tree leaves.

Second, in intra slices, the Luma and Chroma block partitioning structure is separated, and decided independently.

Next, no more CU partitioning into predictions units or transform units is employed. In other words, each Coding Unit is systematically made of a single prediction unit (previously 2N×2N prediction unit partition type) and single transform unit (no division into a transform tree).

However, further improved compression efficiency is needed for QTBT technology.

SUMMARY OF THE INVENTION

These and other drawbacks and disadvantages of the prior art are addressed by at least one of the described embodiments, which are directed to a method and apparatus for coding or decoding a block of video data. In at least one embodiment, it is proposed to use a convolutional neural network to generate a vector of split partition probabilities.

According to at least one general embodiment described herein, there is provided a method for coding a block of video data. The method comprises generating a vector of split possibilities using a convolutional neural network from a block of image data comprising pixels and from additional pixels; partitioning said block of image data into one or more smaller blocks using said vector of split possibilities; and, encoding said one or more smaller blocks.

According to another general embodiment described herein, there is provided an apparatus for coding a block of video data. The apparatus comprises a memory, and a processor, configured to generate a vector of split possibilities using a convolutional neural network from a block of image data comprising pixels and from additional pixels; partition said block of image data into one or more partitions using said vector of split possibilities; and, encode said one or more partitions.

According to another aspect described herein, there is provided a nontransitory computer readable storage medium containing data content generated according to the method of any one of the described method embodiments, or by the apparatus of any one of the described apparatus embodiments for playback using a processor.

According to another aspect described herein, there is provided a signal comprising video data generated according to the method of any one of the described method embodiments for coding a block of video data, or by the apparatus of any one of the described apparatus embodiments for coding a block of video data, for playback using a processor.

According to another aspect described herein, there is provided a computer program product comprising instructions which, when the program is executed by a computer, cause the computer to carry out the method of any one of the described method embodiments.

These and other aspects, features and advantages of the present principles will become apparent from the following detailed description of exemplary embodiments, which is to be read in connection with the accompanying drawings.

DETAILED DESCRIPTION

An approach described for improved entropy coding efficiency of transform coefficients in coding units, providing good compression and minimal increase in coder design complexity.

For clarity, in this description, "dividing", "segmenting" and "splitting" all mean the same thing, which is the act of performing a straight-line division of a block of pixels. Similarly, "splits", and "divisions" mean the same thing, a grouping of pixels as a result of dividing, splitting or segmenting a block or a sub-block.

In the HEVC video compression standard, a picture is divided into so-called Coding Tree Units (CTU), with typical sizes of 64×64, 128×128, or 256×256 pixels.

Figure 1:
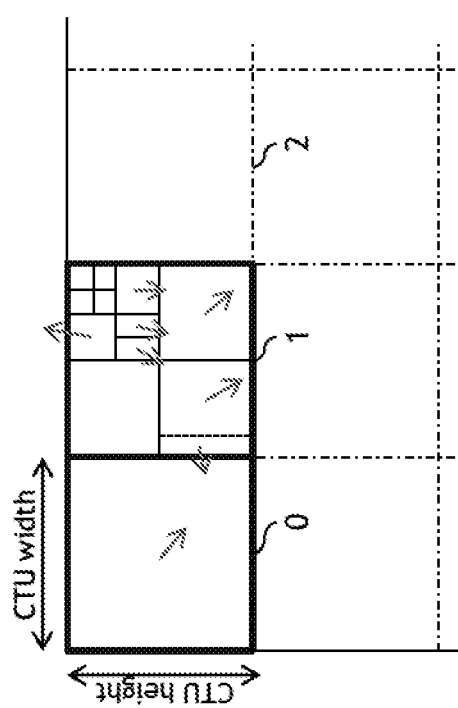
FIG. 1 illustrates one example of a coding tree unit and coding tree concepts to represent a compressed picture.

Each CTU is represented by a Coding Tree in the compressed domain. This is a quad-tree division of the CTU, where each leaf is called a Coding Unit (CU), see FIG. 1.

Figure 2:
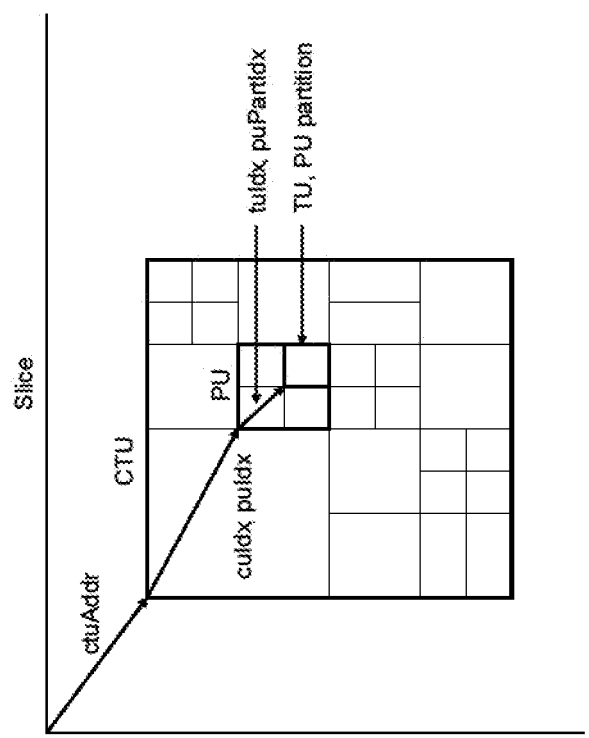
FIG. 2 illustrates an example of the division of a coding tree unit into coding units, prediction units and transform units.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

Figure 3:
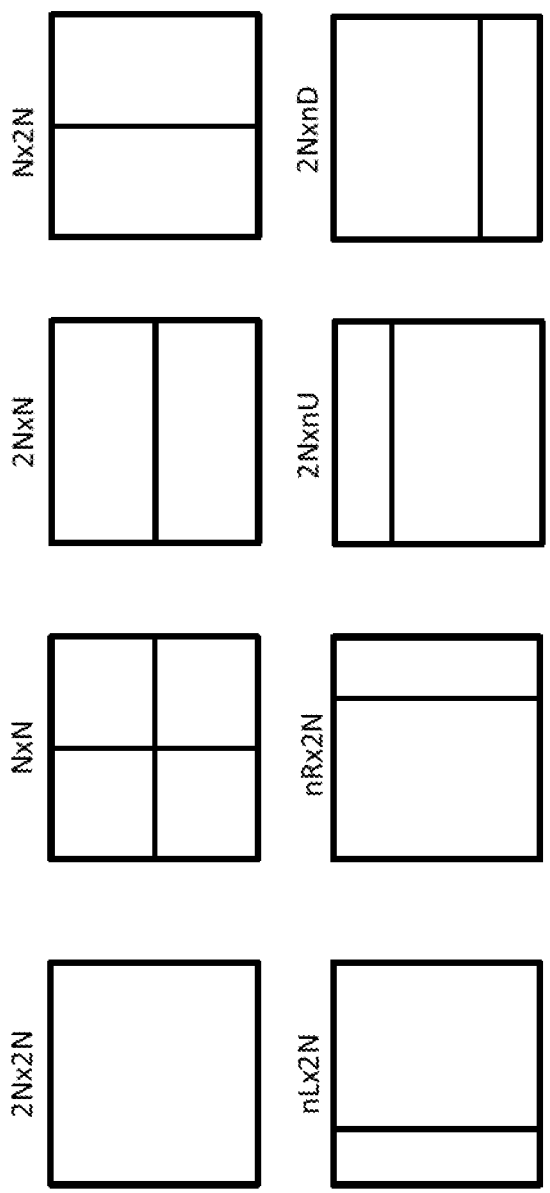
FIG. 3 illustrates an example of partitioning of coding units.

The Partitioning of a Coding Unit into Prediction Unit(s) is done according to the partition type, signaled in the bit-stream. For Intra coding unit, only the partition types 2N×2N and N×N, illustrated in FIG. 3 are used in HEVC. This means only square Prediction Units are used in Intra Coding Units.

On the contrary, Inter Coding Units can use all partition types shown in FIG. 3.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain in order to represent picture data in a more flexible way in the compressed domain. The advantage of this flexible representation of the coding tree is that it provides increased compression efficiency compared to the CU/PU/TU arrangement of the HEVC standard.

Figure 4:
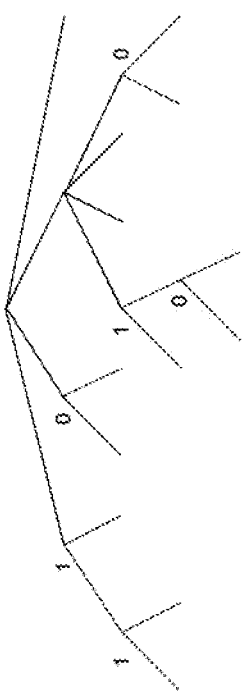
FIG. 4 illustrates an example quad-tree plus binary-tree coding tree unit representation.
Figure 4:
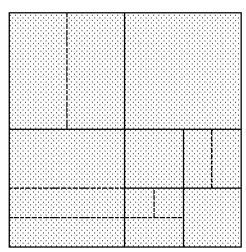
Figure 5:
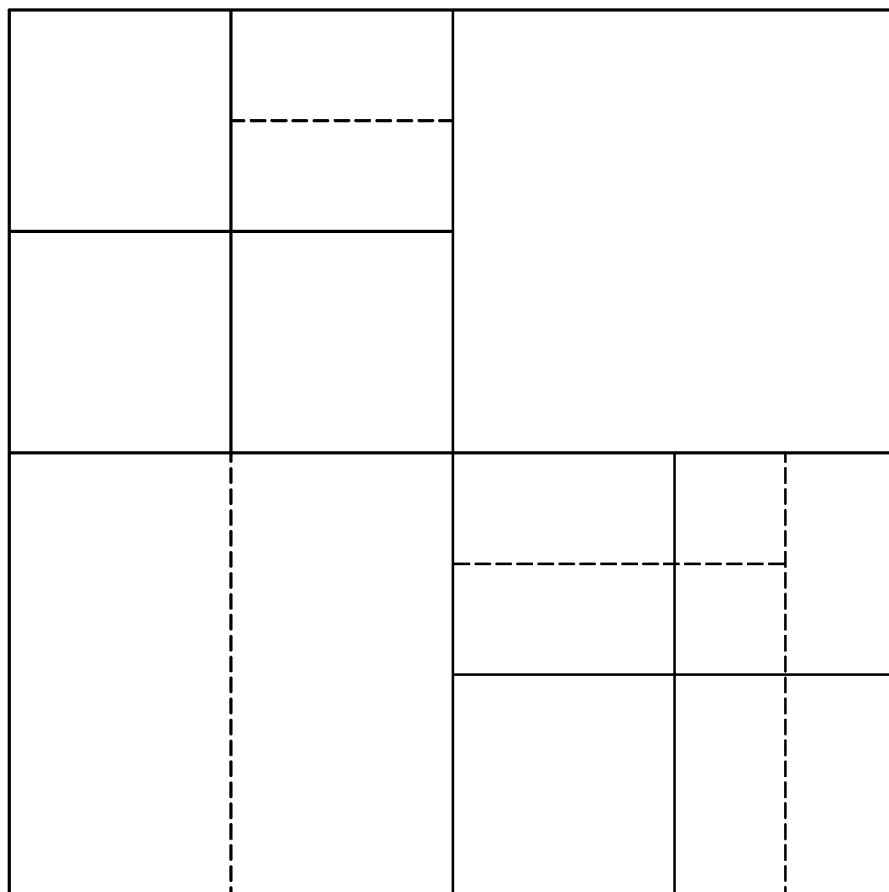
FIG. 5 illustrates one embodiment of a the Quad Tree plus Binary Tree representation on a coding block.

The Quad-Tree plus Binary-Tree (QTBT) coding tool provides this increased flexibility. It consists in a coding tree where coding units can be split both in a quad-tree (4 sub-units) and in a binary-tree (2 sub-units) fashion. Such coding tree representation of a Coding Tree Unit is illustrated in FIG. 4.

The splitting of a coding unit is decided on the encoder side through a rate distortion optimization procedure, which consists in determining the QTBT representation of the CTU with minimal rate distortion cost.

In the QTBT technology, a CU has either square or rectangular shape. The size of coding unit is usually a power of 2, and typically goes from 4 to 256.

In addition to this variety of rectangular shapes for a coding unit, this new CTU representation has the following different characteristics compared to HEVC.

First the QTBT decomposition of a CTU is made of two stages: first the CTU is split in a quad-tree fashion, then each quad-tree leaf can be further divided in a binary fashion. This is illustrated on the right of FIG. 4 where solid lines represent the quad-tree decomposition phase and dashed lines represent the binary decomposition that is spatially embedded in the quad-tree leaves.

Next, in intra slices, the luma and chroma block partitioning structure is separated, and decided independently.

Further, no more CU partitioning into predictions units or transform units is employed. In other words, each Coding Unit is systematically made of a single prediction unit (previously 2N×2N prediction unit partition type) and single transform unit (no division into a transform tree).

The described embodiments concern the domain of picture coding unit representation in compression and aims at further improved compression efficiency.

Figure 7:
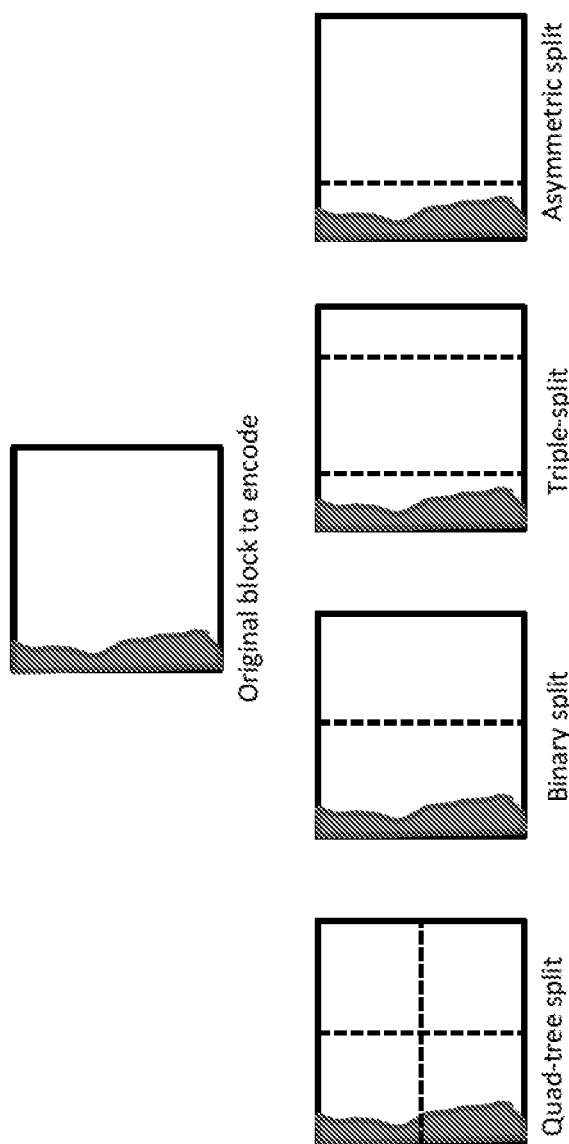
FIG. 7 illustrates different splits of a block to handle a block non-uniformity.

Triple trees, or triple splits, are splitting of a coding unit or sub-unit into three portions. One of the advantages is that all sub-blocks can be a power of 2. The main drawback is that it does not offer as much flexibility to optimally choose the partitioning of the block as it forces three sub-blocks, even if only two are necessary, for example, when the boundary of an object is passing close to the border (see FIG. 7, triple-split vs asymmetric split).

Figure 6:
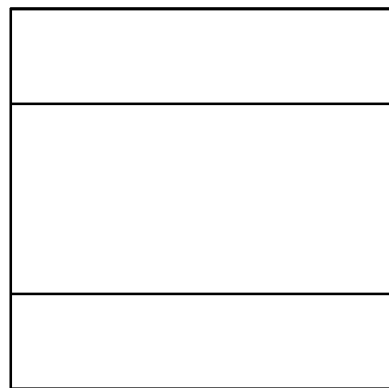
FIG. 6 illustrates triple mode splitting of a block.
Figure 6:
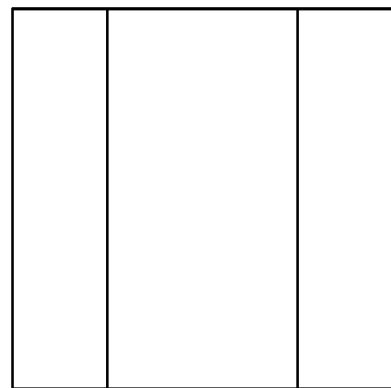
Figure 8:
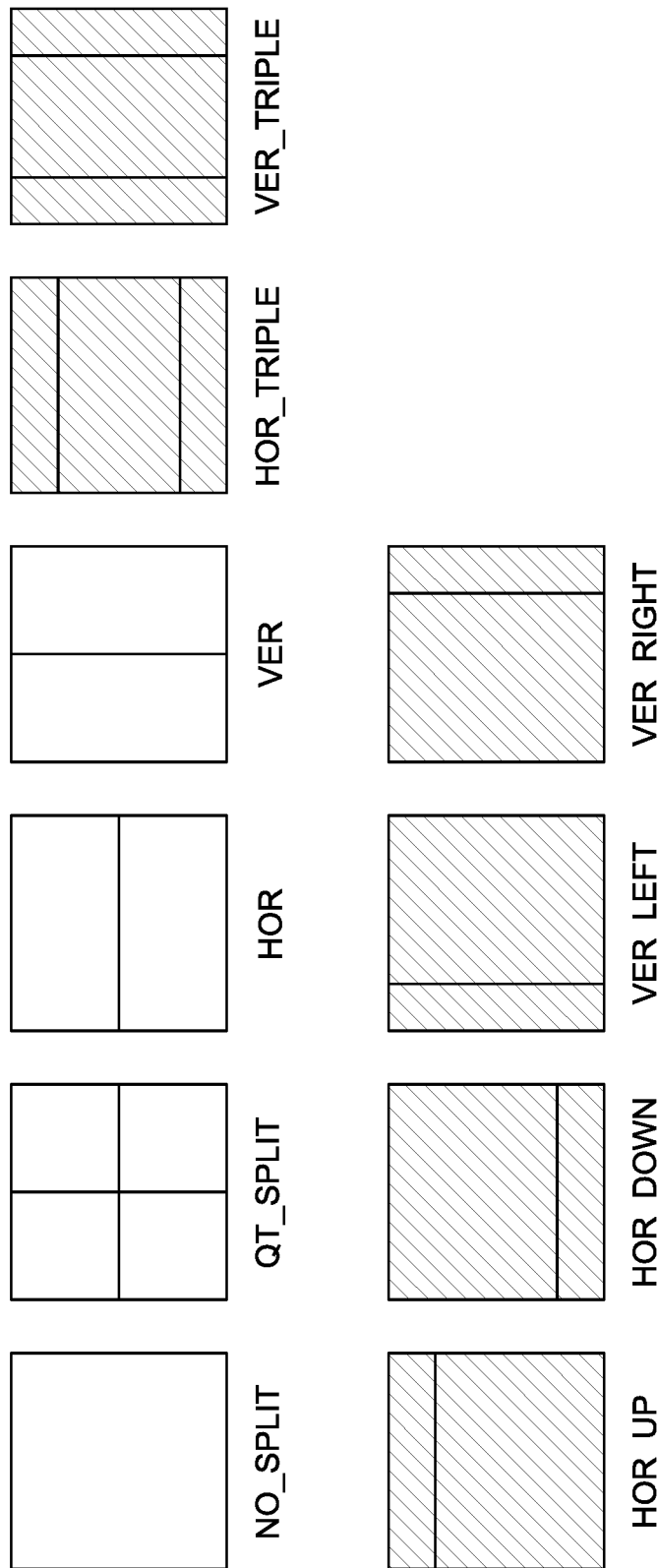
FIG. 8 illustrates the set of all Coding Unit spitting modes supported in the video coding scheme herein described.

A coding unit splitting mode, called the horizontal or vertical triple tree splitting mode, consists in dividing a coding unit (CU) into 3 sub-coding-units (sub-CUs), with respective sizes equal ¼, ½ and ¼ of the parent CU size in the direction of the considered spatial division. This is illustrated in FIG. 6. FIG. 8 shows the set of all Coding Unit spitting modes supported in the video coding scheme herein described.

The problem addressed by at least one of the described embodiments is how to improve and/or accelerate the Rate Distortion Optimization (RDO) that is performed at an encoder, which corresponds to the decisions made by the encoder to select the best tools of a standard to compress a (liven block, macroblock or Coding Tree Unit (CTU). Instead of checking the bitrate/distortion at each block level to find the optimal partitions, a CNN (Convolutional Neural Network) network provides a probability score of each type of possible split into smaller blocks. The computation of this score is very fast since it can be highly parallelizable and can be less complex than a classical RDO operation.

These embodiments are incorporated within the framework of compression of video, specifically at the encoding stage where decisions are made to partition the images of a given input video sequence into blocks. Since H.264/MPEG4-AVC, hybrid codecs have partitioned the images into blocks of different sizes to adapt their compression tools to the textures and objects. In H.265/HEVC for example, the images are first divided into 64×64 non-overlapping Coding Tree Units (CTU), which are then potentially split into smaller Coding Units (CU) down to 8×8 pixels. Although the standards only specify the syntax that signals the sizes of these CU, encoders require an efficient way to choose and optimize the sizes over the images, depending on its ability to compress the different regions. This process is included into the so-called Rate-Distortion Optimization (RDO) that aims at finding the best compromise between a target quality of a reconstructed region and the required bits to be transmitted. Basically, if a CTU contains a signal which is well predicted and reconstructed, there is no need to split it into small blocks, which would result in more syntax. However, when a highly detailed texture is difficult to encode and results in residuals with a high energy, it is relevant to split into small blocks since the price of the syntax is worthwhile compared to the cost reduction of residuals. A full RDO would then consist in evaluating every possible block partitioning of a CTU, which is of huge complexity. A reference software encoder uses a subset of the full RDO, considers only a fixed causal part in the CTU and adds some heuristics but the combinatory remains very high.

Classical encoders start from the evaluation of bigger blocks and take at each level the decision to split into smaller blocks. In the proposed embodiments described herein, deep-learning is used to predict when to split a given block into smaller blocks and how to do so.

To perform RDO with an acceptable complexity, several methods have been implemented in existing codecs.

First, split the search into 2 passes: a first pass performs almost all the prediction modes and splitting options but evaluates the energy of the potential residual with a fast method. Then, the partitioning is fixed, and the second pass precisely evaluates the cost of a subset of best selected modes, transforms or other tools.

In addition, heuristics can be used to avoid less probable partitions, for example by considering the partitioning of previously coded neighboring regions.

The proposed method herein enables much faster selections of partitions while keeping an excellent and driven accuracy.

A prior fast-encoding method involving CNN-based methods for RDO speedup has several limitations. In this method, a convolutional network is used to make decisions on whether to split a given block, within the framework of HEVC.

However, the output of the CNN is a duplet of values that give information on the probabilities of whether to split a current block into 4 smaller quadtree blocks. The embodiments described herein enable the consideration of multiple types of splits: for example, quadtree, binary tree as detailed later.

And, all blocks from 8×8 to 32×32 are first sampled to an 8×8 matrix by averaging, providing an 8×8 matrix as input to the CNN. Although this clearly shows an advantage in terms of implementation, i.e. a unique CNN for all block sizes, it reduces the performances in terms of efficiency to distinguish borders at each level of the partition tree.

The basic idea of the proposed embodiments is use a CNN to improve the Rate Distortion Optimization at the encoder side of existing and future codecs. Specifically, this technique allows a system to compute better decisions of partitioning the images in terms of accuracy and speed.

The embodiments described offer methods that consider the properties of the initial blocks, such as CTUs in HEVC for instance, and provide probabilities of splitting them into smaller shapes.

Figure 9:
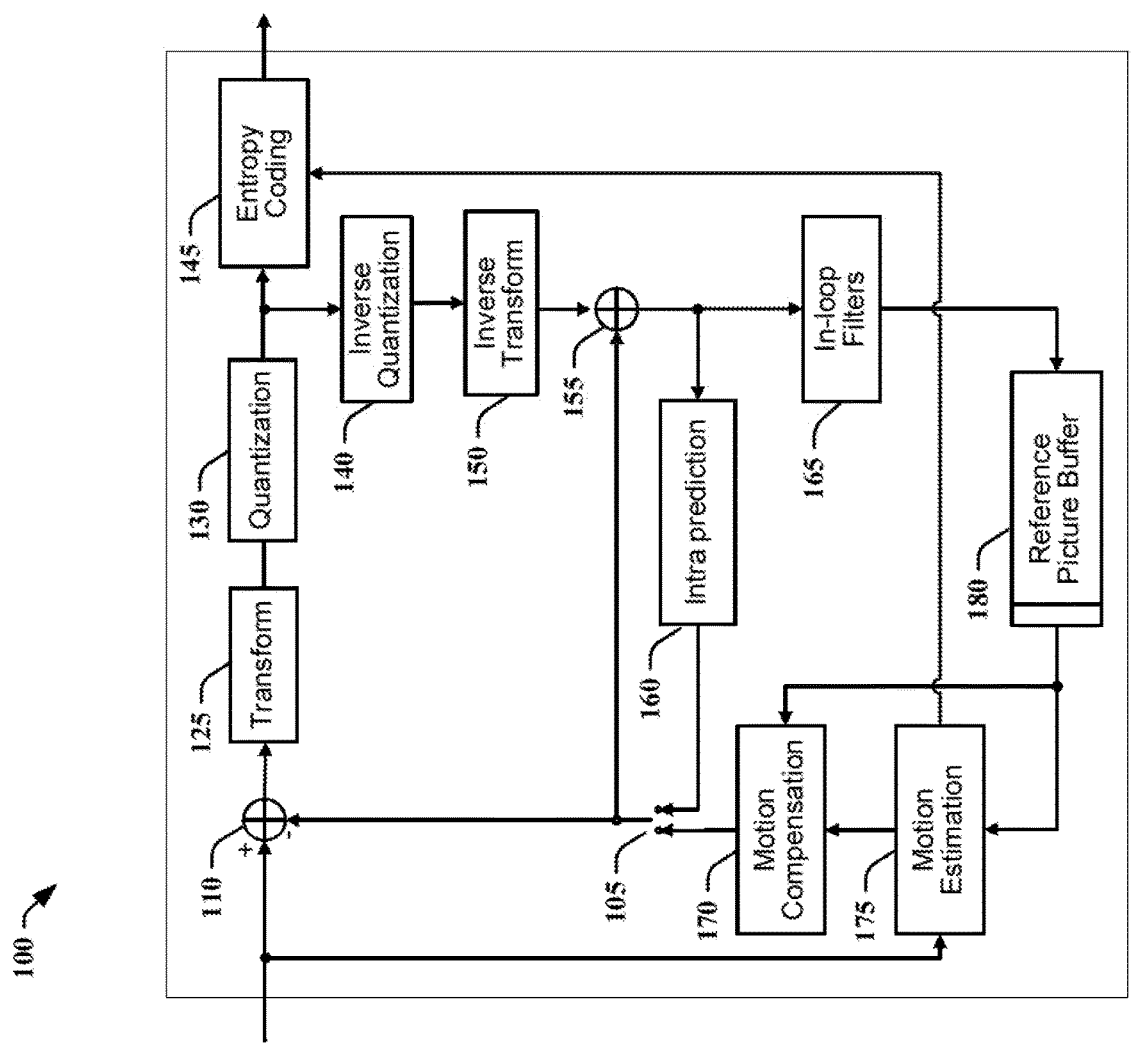
FIG. 9 illustrates a standard, generic video compression scheme.

These methods aim at piloting the encoder decisions, and therefore are applicable to encoders and improving the encoding decisions. It is not directly related to one element of FIG. 9 since this figure depicts the processing of a given Coding Unit. However, it enables the partitioning of the Coding Tree Units while avoiding several Rate-Distortion checks for some potential blocks and their corresponding complexity, resulting in the entire process described in FIG. 9.

The description of the present solution is based on an exemplary version of the reference software designed by the joint Video Exploration Team (JVET) to design the next MPEG/ITU standard for video coding, currently known as H.266.

In this framework, the images are divided into non-overlapping Coding Tree Units (CTUs), like in HEVC. CTUs then correspond to the biggest blocks that can be considered for encoding a given region. In the current version, CTUs' are of size 256×256 pixels. Then, when the texture is difficult to predict and encode on the entire CTU's surface, smaller blocks are considered. This allows choosing different prediction/transform/coding tools per blocks that adapt to the textures. This is at the price of transmitting more syntax elements to describe those choices and block shapes. Hence, Rate Distortion Optimization is performed to select the best modes and the best partition with respect to a given quality and/or bitrate target. There is a balance that needs to be found between the cost of residuals after prediction and transform and the cost of syntax elements that describe the encoding tools. The bigger the blocks on detailed areas, the more energy of the residuals. On the other hand, the smaller the blocks, the costlier the syntax elements.

In HEVC, the structure of block partitions follows a quadtree. So, for each tree depth, the encoder can decide whether to encode directly the current block or split it into four sub-blocks. This is typically done by evaluating the cost of encoding the block at its current size and comparing it to the sum of the 4 costs of the sub-blocks. If, for a given quality, it costs less bits to transmit the syntax for smaller blocks, the encoder proceeds to the evaluation of the next level of depth in the coding tree. This requires trying out the different prediction modes and transforms and other tools of the standard for all the block sizes until the encoder reaches a block size that minimizes the cost, hence the high complexity of encoders compared to decoders.

In the case of H.266 encoders, the complexity is even bigger for multiple reasons:

Block sizes range up to 256×256

Different block shapes are considered: square and rectangle blocks

More prediction tools

More transforms

As the described embodiments tackle the improvement in choice of block shapes, the following paragraphs will focus on the first two reasons above.

These embodiments propose to use a Convolutional Neural Network CNN-based method to speed-up the process of deciding to split a block or not. Several output decisions of this process occur:

No split: encode the block at its current size and shape

Split (quad/binary/ . . . ): perform the chosen split and continue with the encoding at the next level of depth.

No action: let the encoder perform the cost evaluation and make decisions in the classical way.

The next sections detail the CNN architecture, its inputs/outputs, how it is trained and how it is used by the encoder to process the partition tree decisions.

Figure 10:
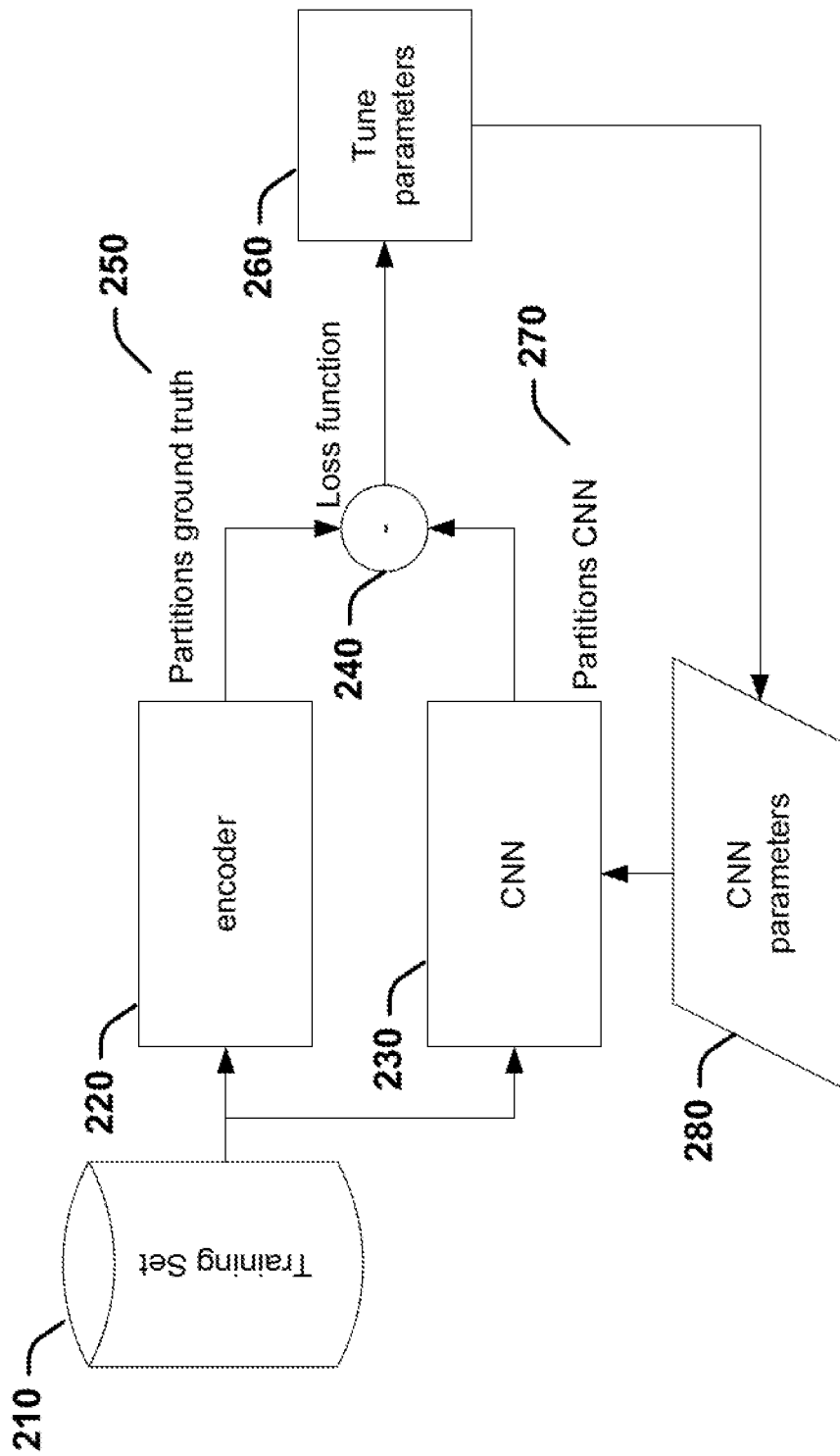
FIG. 10 illustrates an embodiment for training a CNN (Convolutional Neural Network).

FIG. 10 depicts the framework for training the parameters of the CNN.

First, a large dataset of patches 210 (CTU and other information) is collected to build up the training set. The CTUs are gathered within raw sequences. When a CTU is at the border of the image, the missing pixels in the L-shape are assigned a signal median value, for example, 128 for an 8 bit sequence or 512 for a 10 bit sequence. This corresponds to what is done for intra prediction within the codec. Thus, the CNN will be more accurate on the split probabilities since trained with similar inputs as the classical RDO. The CTUs are classically encoded to derive the ground truth vector of borders that would be chosen by the actual encoder 220. In parallel, the CNN provides a prediction vector of partitions 270 using its current parameters.

The vectors are compared using a loss function 240. For example, the Mean Squared Error is used to evaluate the vectors. This loss is then used to derive/tune new parameters of the CNN through an optimization process 260.

Once this CNN is trained on a very large set of images and its parameters are set, the CNN can be directly used by the encoder.

Figure 11:
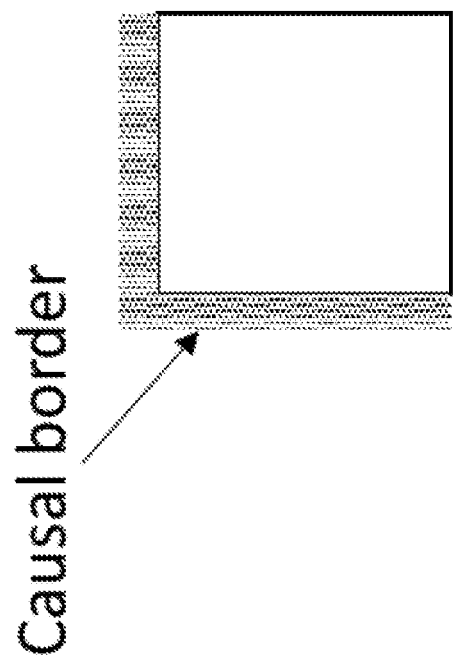
FIG. 11 illustrates inputs of a CNN.

Contrary to a prior solution, the input of the CNN is a block or patch of pixels that correspond to the whole CTU plus the causal L-shape of pixels neighboring the CTU, as depicted in FIG. 11. For example, with a CTU of size 64×64, the input patches are then of size (64+N)×(64+N) where N is the size of the causal border. In practice, we choose N=1. The reason to add the border is that the coder itself uses this causal boundary to perform the prediction of the block.

In a first embodiment, the causal border is coming from the original frame. In this case, one advantage is that the CNN processing of each CTU can be done in parallel since it only uses the original frame.

In a second embodiment, the causal border is coming from the decoded neighbors. In this case, one advantage is that the CNN is using the same input as the encoder for the prediction, hence more accurate. However, in this embodiment the processing of each CTU cannot be done in parallel since it uses the decoded frame.

In HEVC or H266, the splits of the Top and Left neighbors have some influence on the coding cost of the splits of the current CTU. For example, in HEVC, the splits flag at each level of the tree are based on a contextual entropy coding depending on the split depth of the neighbors.

To take into account this information in the CNN, a secondary channel (the primary channel of the input being the texture and causal border) can be added.

Figure 12:
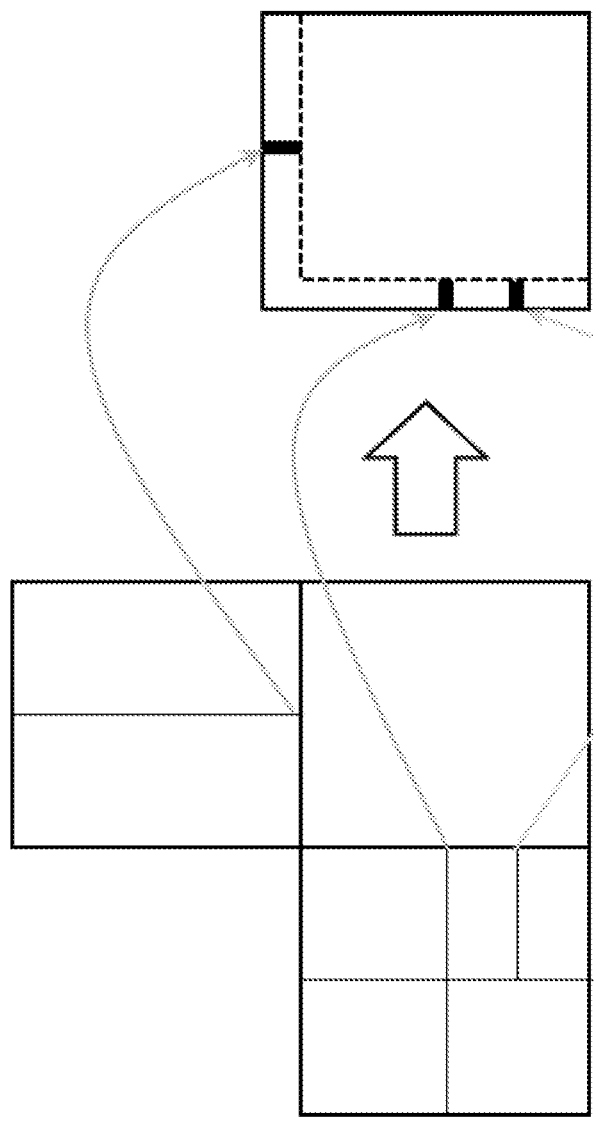
FIG. 12 illustrates boundary information as a secondary input channel.

In FIG. 12, we show an example where a part of the neighbors split is input as a secondary channel.

Figure 13:
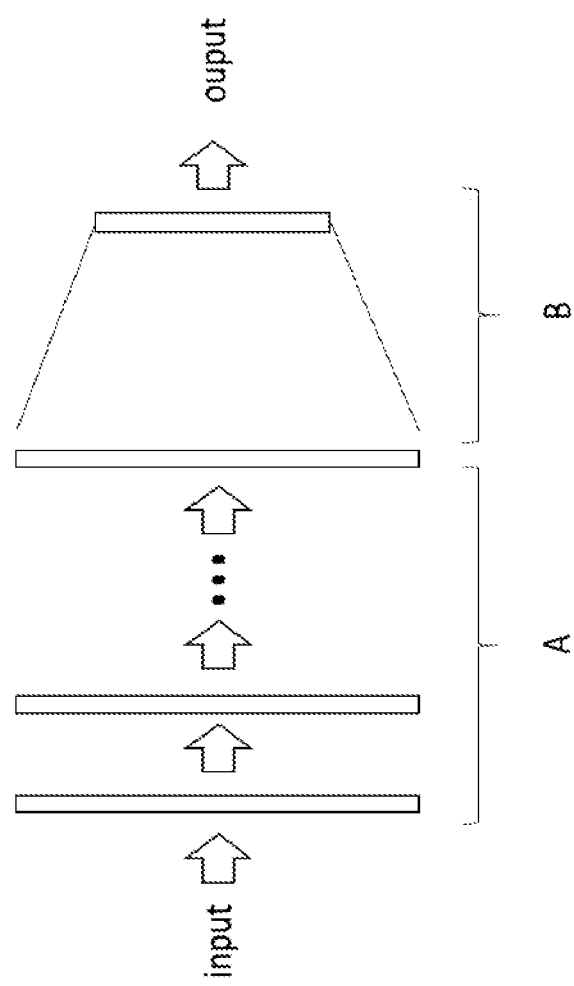
FIG. 13 illustrates a classical design for a CNN.

In FIG. 13, we show a general design for a Convolutional Neural Network (CNN), where the first part A is composed of convolutional layers, and the part B is composed of Fully Connected (FC) layers which reduce the dimension of the output of part A to the dimension of the output.

Note that part A can contain other types of layers (MaxPool, Addition etc.) and part B can comprise other dimension reducing layers (MaxPool etc.). MaxPool takes a maximum value from each cluster of neurons at a previous layer.

Figure 14:
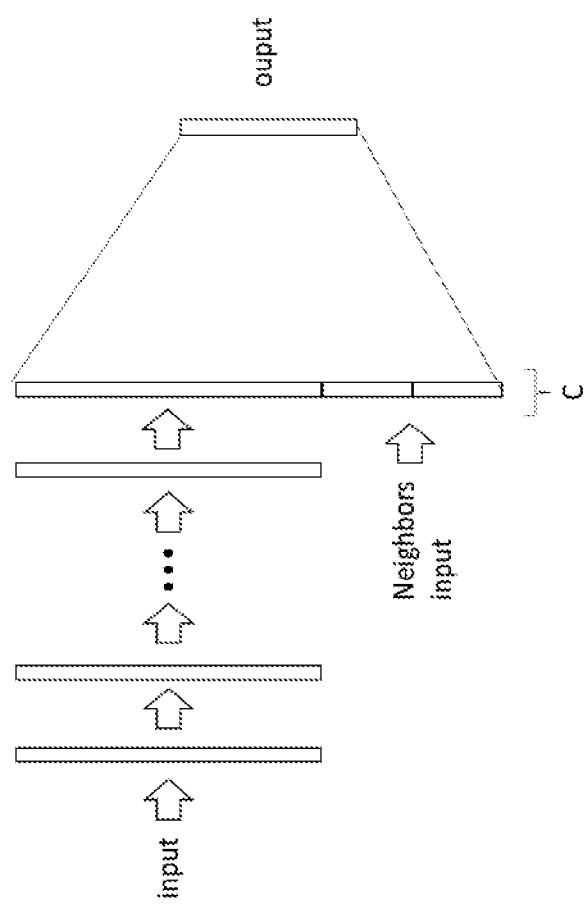
FIG. 14 illustrates neighbors split input.

In FIG. 14, another way is shown to input neighbor's information. The first part of the network remains unchanged (similar to part A), and the vectors representing the top and left neighbors are concatenated (layer C) to the output of part A (the vector representation is explained in later sections). The remaining portion is then similar to part B, dimension reduction using FC layers or other type of layers.

Figure 15:
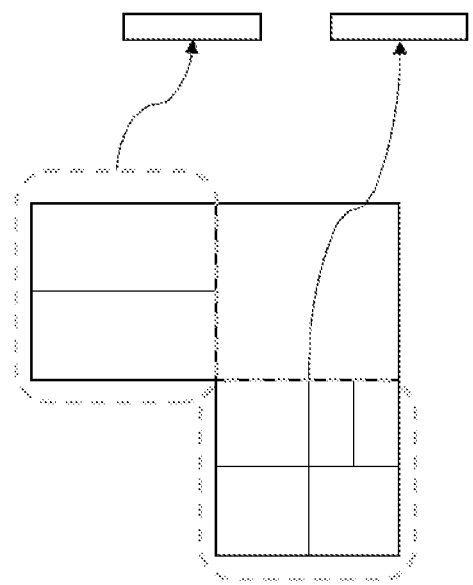
FIG. 15 illustrates neighbors split as vectors.

In FIG. 15, we show how the neighbors' splits are transformed into an information vector used in layer C of the network in FIG. 14. The vector construction is similar to the one for the output.

Figure 16:
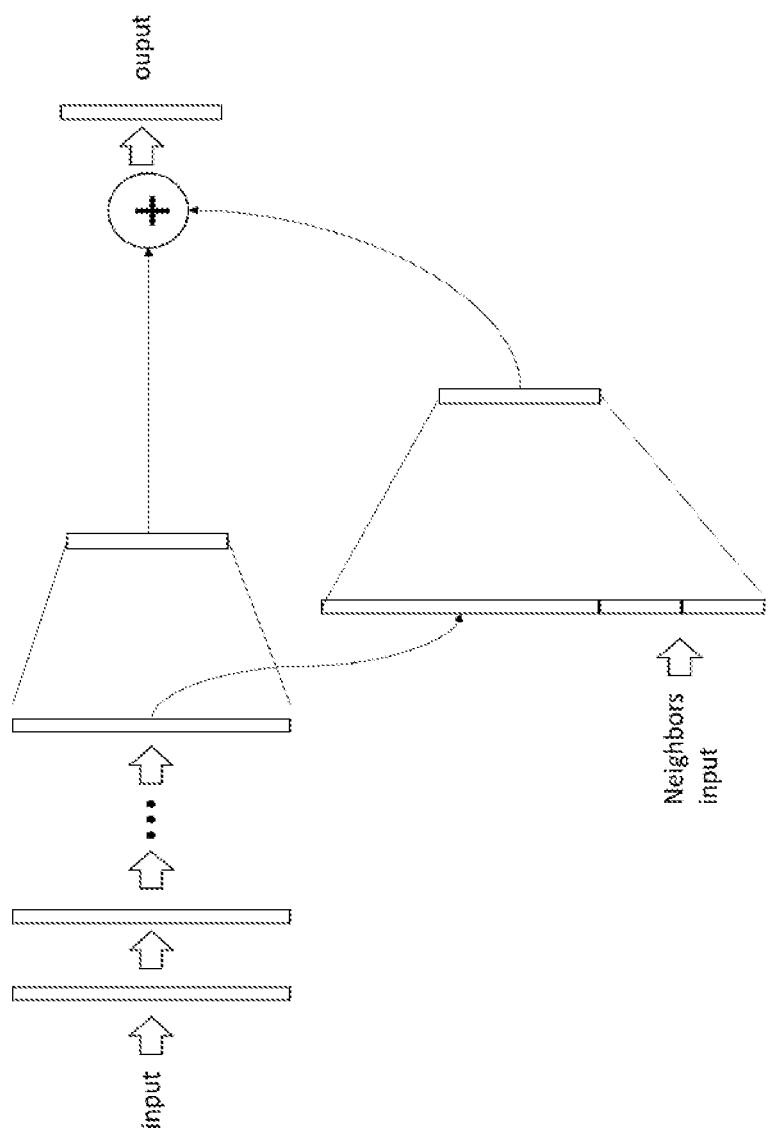
FIG. 16 illustrates neighbors split input as a residual.

FIG. 16 shows an alternative design where the concatenated output of part A and neighbors splits produces a "residual" vector after dimension reduction, which is added to the original vector found using only the texture information.

Figure 17:
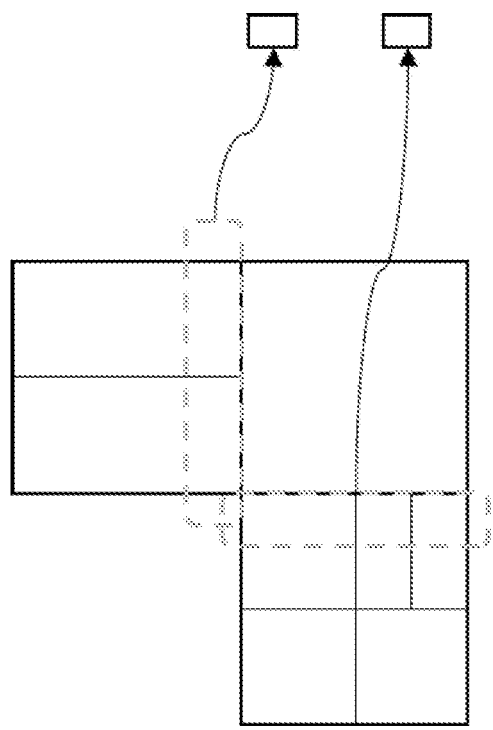
FIG. 17 illustrates reduced neighbors splits information.

As an alternative, the vectors representing the neighbors' splits can be of reduced dimension. For example, the full vector representing the splits of a 64×64 CU is of dimension 480, as explained shortly. However, using only the splits information close to the border of the current CU would reduce the components to only 15 (see FIG. 17).

As the splits results depend a lot on the target QP, one can train a network by QP, or every n QP. Another method is to input the QP as an input channel. In this case, the quantization scale is normalized between 0 and 1 before input. Note that it also allows the setting of a QP by sub-block.

Figure 25:
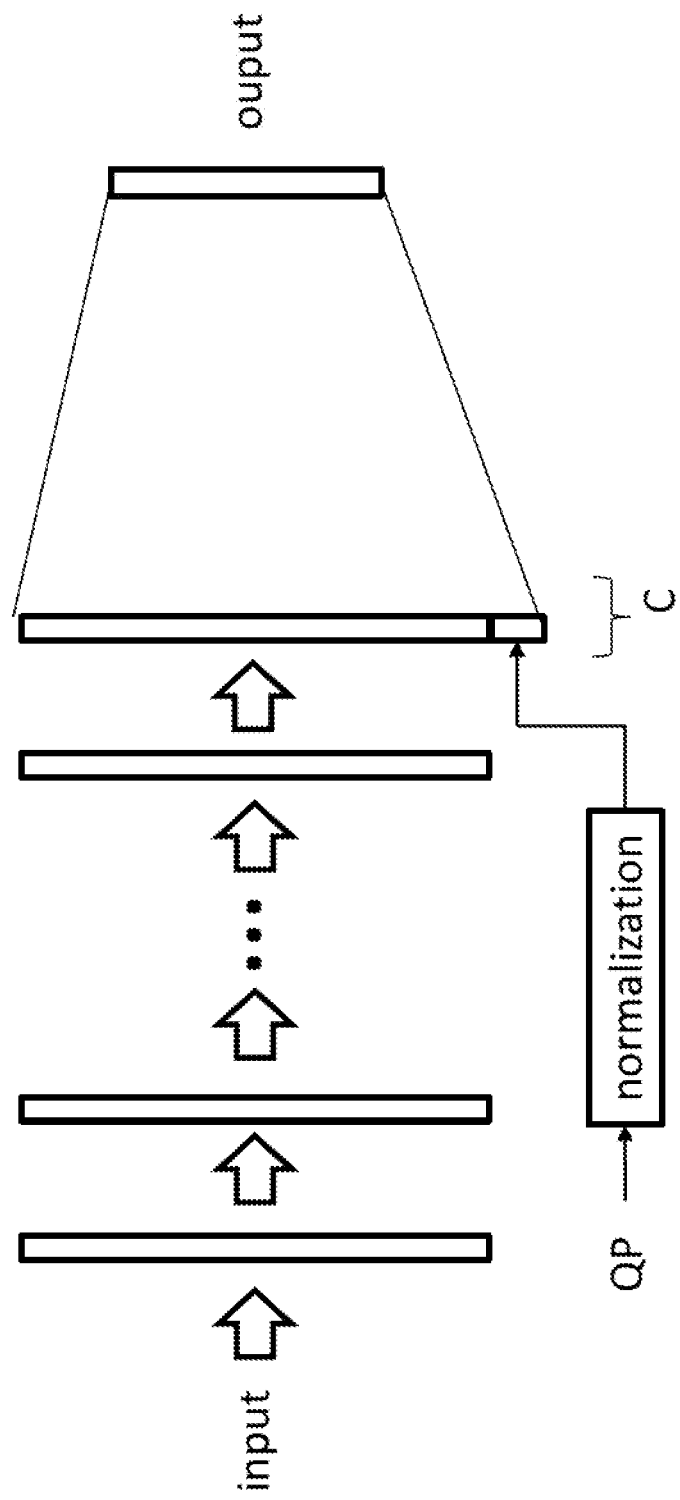
FIG. 25 illustrates one embodiment of an apparatus using the described aspects.

In another embodiment, the QP of the bloc is input after the convolutional part, i.e. in the fully connected part. It is simply a component added to the vector resulting of the convolutional part, after a normalization (see FIG. 25).

In another embodiment, the input of the CNN takes several component channels, for example to deduce the split tree of the chroma components, both U and V components are input. In another embodiment, when the luma and the chroma share the same tree, all 3 components are input.

In another embodiment, the CNN is not run on each bloc of the image. For example, for inter mode slice, the CNN is only run when intra modes are being considered.

Figure 18:
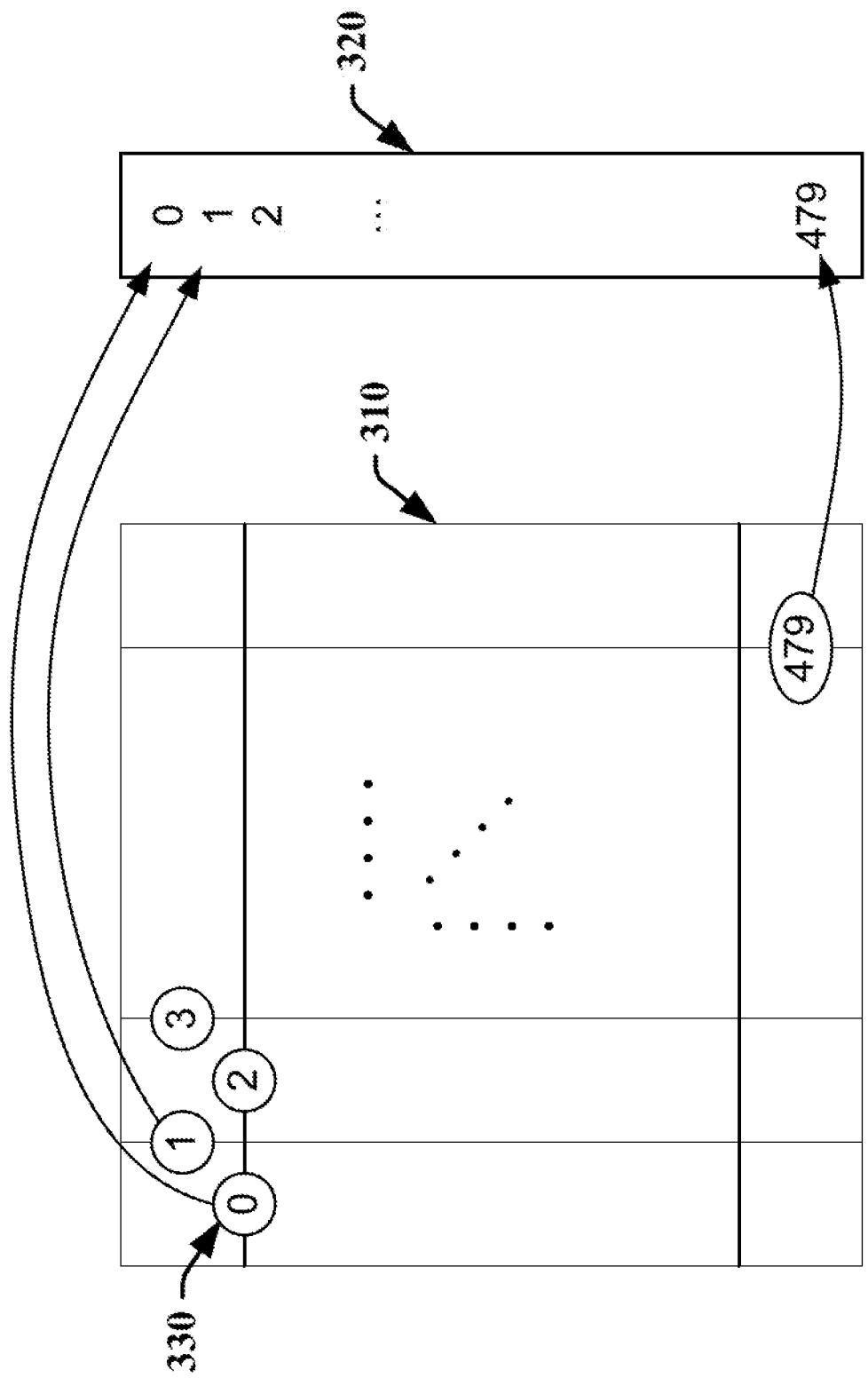
FIG. 18 illustrates resulting vector of boundaries.

The output of the CNN corresponds to a vector in which each value represents one possible border within a given CTU. In H.266, the minimal block size being 4×4, only pixel borders on a 4×4 grid can be considered for block splits. Hence, for each potential border, the CNN outputs a probability for it to correspond to an actual border between two blocks. For instance, with a CTU size of 64×64, a vector of size 480×1 is considered. FIG. 18 depicts an exemplary mapping between potential 4 pixel-long borders in a CTU (310) and their corresponding value in the output vector (320). Each boundary, for example, boundary #0 (330), is assigned an index which can be in a predefined order. In the example shown, the CTU is of size 64×64, which results in a vector of 480 values. More generally, the size of the vector would be S=2*N*(N−1) where N=W/w, where W is the CTU size in pixels (for example, W=64) and w is the sub-block size (for example, w=4).

As learning the full splits configuration of a network might be difficult, a system can learn a subset of the splits, considering the recursive evaluation of the splits.

The example here shows only the first level of split is learned for different split policy.

Figure 19:
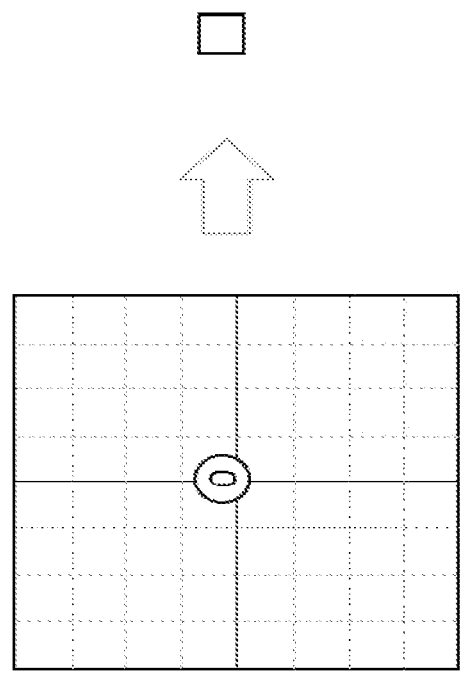
FIG. 19 illustrates a quadtree (QT) split vector.
Figure 19:
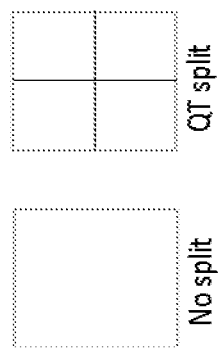

FIG. 19 shows an example where only one level of the tree is learned and the only policy for this level is the quadtree split, similar to the HEVC split policy. In this case, the vector of split to learn is reduced to only 1 component.

Figure 20:
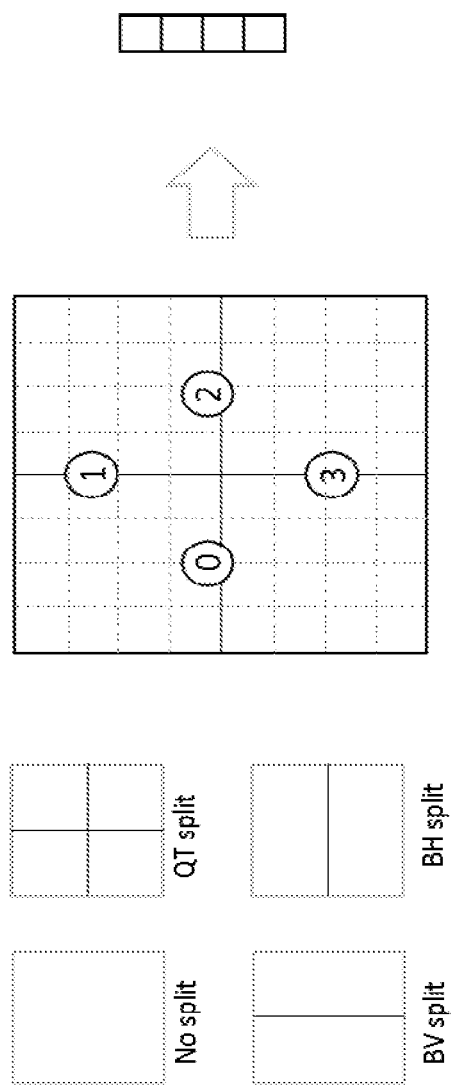
FIG. 20 illustrates quadtree (QT), binary vertical (BV), binary horizontal (BH) splits vector construction.

FIG. 20 shows how to construct a split vector representing one split depth with a Quadtree (QT) and BinaryTree (BT) policy.

Figure 21:
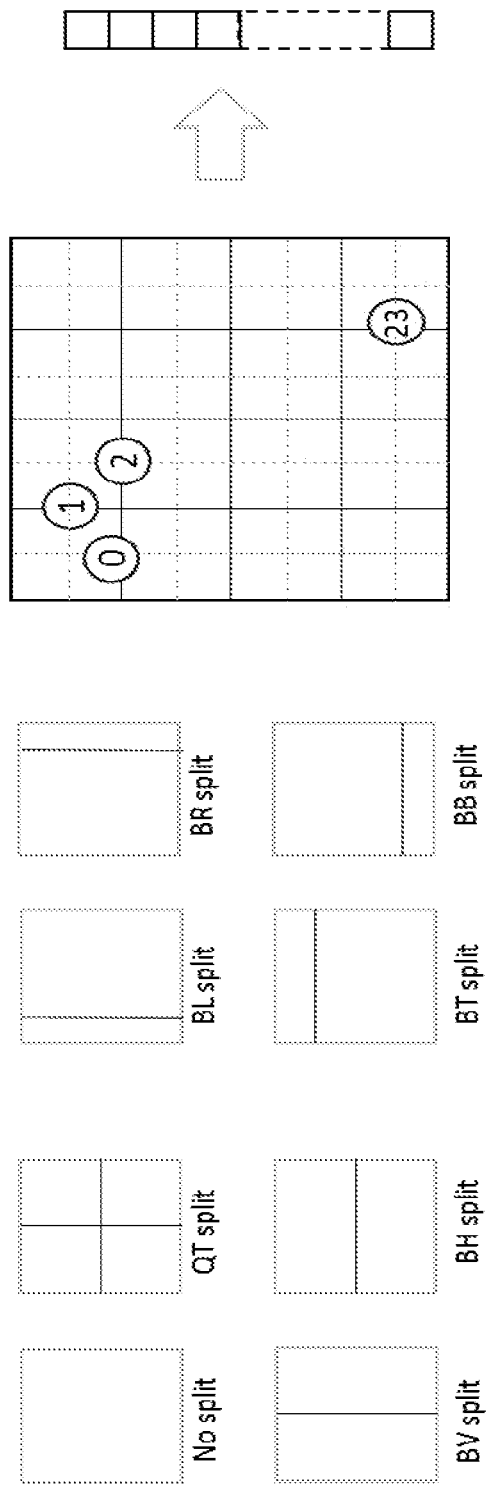
FIG. 21 illustrates Quadtree (QT), binary vertical (BV), binary horizontal (BH), asymmetric binary top (BT), asymmetric binary bottom (BB), asymmetric binary left (BL) and asymmetric binary right (BR) splits vector construction.

FIG. 21 shows how to construct a split vector representing one split depth with a Quadtree (QT) and BinaryTree (BT) and ABT (asymmetric binary tree) policy.

An alternative to learn only one level of split is to put more importance on the prediction of the splits of the first level during the training stage. For this alternative, the full splits vector can be kept but, the loss function is slightly modified to account for the importance of the splits prediction dependence on the level:

$$L = \sum_i \omega_i \|S_i - \hat{S}_i\|^2$$

where $S_i$ is the around truth value of a component of the splits vector, $\hat{S}_i$ the prediction of the same component and $\omega_i$ a weight on the prediction. For example, the weights corresponding to boundaries in FIG. 21 can be set to a value α (with α>1), while other components keep a weight of 1.

Figure 22:
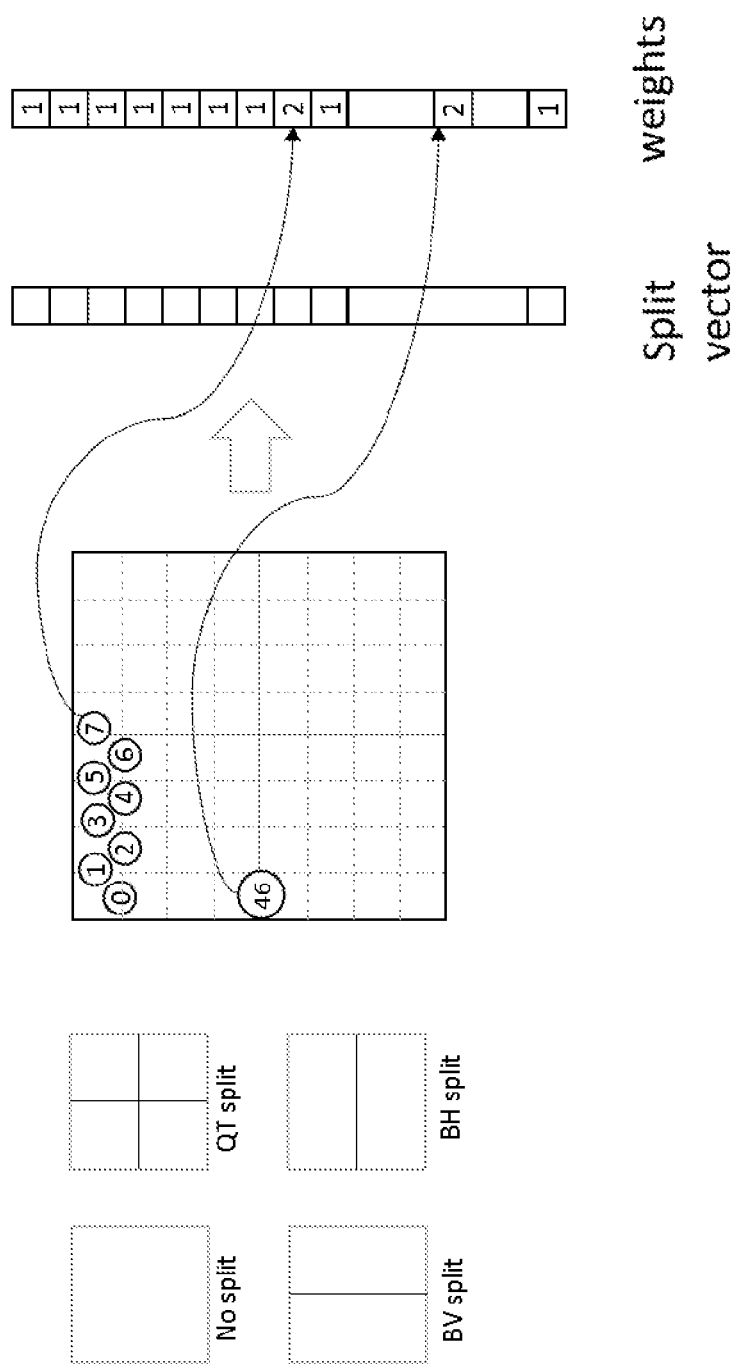
FIG. 22 illustrates an example of component weighting for a QTBT policy.

FIG. 22 shows an example where boundaries corresponding to the first level of a QTBT split policy have a weight of 2, while the other components keep a weight of 1.

One advantage of the proposed methods is that they can accelerate the decision time for an encoder to determine a partitioning of a block.

The aforementioned embodiments have been described with respect to an encoder or encoding operation. A decoder would simply interpret the splits generated at an encoder using the described embodiments in the same way as splits generated with an RDO process, or any other type of splitting embodiment.

Figure 23:
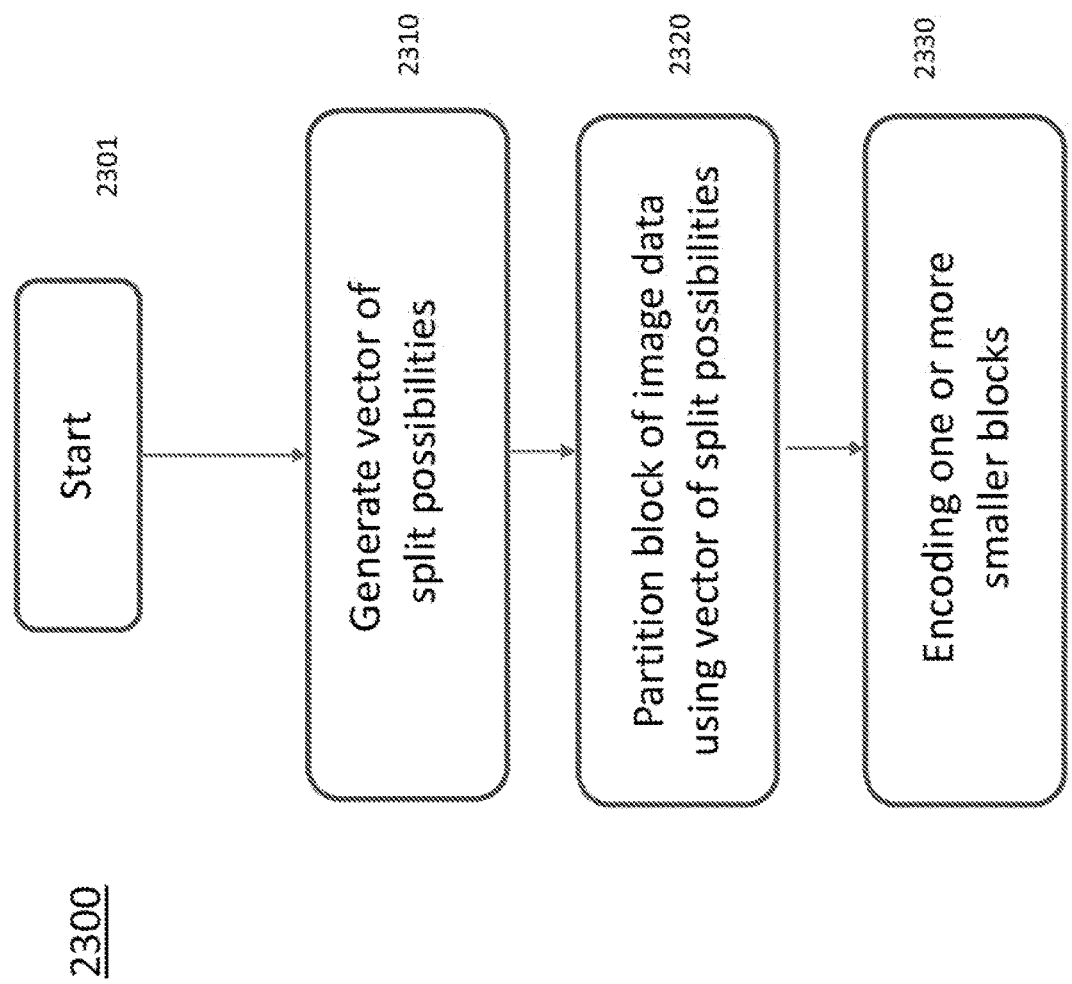
FIG. 23 illustrates one embodiment of a method using the described aspects.

FIG. 23 shows one embodiment of a method 2300 for coding a block of video data. The method commences at Start block 2301 and proceeds to block 2310 for generating a vector of split possibilities for a block of image data using pixels of the image. Control proceeds from block 2310 to block 2320 for partitioning a block using the vector of split possibilities. Control proceeds from block 2320 to block 2330 for encoding one or more of the smaller blocks of the block.

Figure 24:
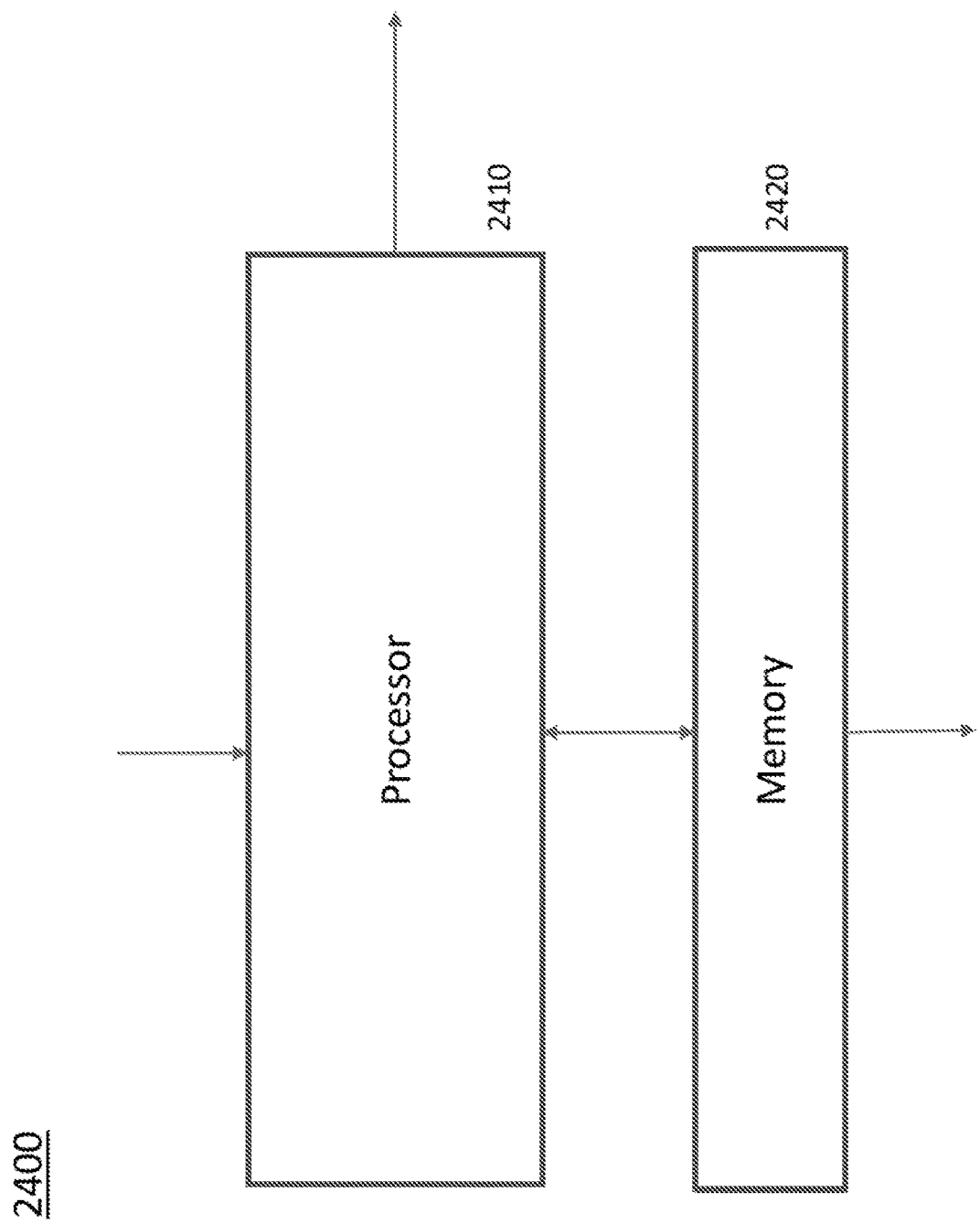
FIG. 24 illustrates one embodiment of an apparatus using the described aspects.

FIG. 24 shows one embodiment of an apparatus 2400 for coding or decoding a block of video data. The apparatus comprises Processor 2410 which has input and output ports and is in signal connectivity with Memory 2420, also having input and output ports. The apparatus can execute the aforementioned method embodiment, or any variations thereof.

The functions of the various elements shown in the figures can be provided using dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

The present description illustrates the present ideas. It will thus be appreciated that those skilled in the art will be able to devise various arrangements that, although not explicitly described or shown herein, embody the present ideas and are included within its scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

In the claims herein, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The invention claimed is:

1. A method for video processing, comprising:
   determining, using a convolutional neural network, a vector of split possibilities based on a block of image data and a plurality of pixels adjacent to the block, wherein the plurality of pixels comprises a causal pixel, wherein the causal pixel is adjacent to the block of image data, wherein the causal pixel is a pixel of a causal border of the block of image data, wherein the causal border comprises a row of pixels on top of the block of image data and a column of pixels to the left of the block of image data, wherein the convolutional neural network comprises a convolutional layer and a fully connected layer, wherein an output of the convolutional layer comprises a vector associated with a level of splitting, wherein the output of the convolutional layer is concatenated with quantization information associated with the block of image data, wherein the output of the convolution layer, concatenated with the quantization information, is an input of the fully connected layer, and wherein an output of the fully connected layer, based on a dimension reduction, comprises the vector of split possibilities;
   partitioning the block of image data into a plurality of smaller blocks based on the vector of split possibilities; and
   predicting the plurality of smaller blocks.

2. A non-transitory computer readable medium containing program instructions that, when executed by a processor, cause the processor to perform a method comprising:
   determining, using a convolutional neural network, a vector of split possibilities based on a block of image data and a plurality of pixels adjacent to the block, wherein the plurality of pixels comprises a causal pixel, wherein the causal pixel is adjacent to the block of image data, wherein the causal pixel is a pixel of a causal border of the block of image data, wherein the causal border comprises a row of pixels on top of the block of image data and a column of pixels to the left of the block of image data, wherein the convolutional neural network comprises a convolutional layer and a fully connected layer, wherein an output of the convolutional layer comprises a vector associated with a level of splitting, wherein the output of the convolutional layer is concatenated with quantization information associated with the block of image data, wherein the output of the convolution layer, concatenated with the quantization information, is an input of the fully connected layer, and wherein an output of the fully connected layer, based on a dimension reduction, comprises the vector of split possibilities;
   partitioning the block of image data into a plurality of smaller blocks based on the vector of split possibilities; and
   predicting the plurality of smaller blocks.

3. A non-transitory computer program product comprising program instructions which, when executed by a computer, cause the computer to decode or encode data generated according to the method of claim 1.

4. An apparatus for video processing, comprising:
   a memory, and
   at least one processor, configured to:
   determine, using a convolutional neural network, a vector of split possibilities based on a block of image data and a plurality of pixels adjacent to the block, wherein the plurality of pixels comprises a causal pixel, wherein the causal pixel is adjacent to the block of image data, wherein the causal pixel is a pixel of a causal border of the block of image data, wherein the causal border comprises a row of pixels on top of the block of image data and a column of pixels to the left of the block of image data, wherein the convolutional neural network comprises a convolutional layer and a fully connected layer, wherein an output of the convolutional layer comprises a vector associated with a level of splitting, wherein the output of the convolutional layer is concatenated with quantization information associated with the block of image data, wherein the output of the convolutional layer, concatenated with the quantization information, is an input of the fully connected layer, and wherein an output of the fully connected layer, based on a dimension reduction, comprises the vector of split possibilities;
   partition the block of image data into a plurality of smaller blocks based on the vector of split possibilities; and
   predict the plurality of smaller blocks.

5. A non-transitory computer program product comprising program instructions which, when executed by a processor, cause the processor to decode or encode data generated by the apparatus of claim 4.

6. The method of claim 1, wherein the quantization information comprises a quantization parameter of the block of image data.

7. The apparatus of claim 4, wherein the quantization information comprises a quantization parameter of the block of image data.

8. The method of claim 1, wherein the causal border of the block of image data is associated with a reconstructed image.

9. The method of claim 1, wherein information relating to a spatial neighboring block of the block of image data is concatenated to an input and further input to said convolutional neural network.

10. The apparatus of claim 4, wherein the block of image data is associated with an image, and the causal border of the block of image data is associated with the image.

11. The apparatus of claim 4, wherein the causal border of the block of image data is associated with a reconstructed image.

12. The apparatus of claim 4, wherein information relating to a spatial neighboring block of the block of image data is concatenated to an input and further input to the convolutional neural network.

13. The apparatus of claim 4, wherein the determination of the vector of split possibilities using the convolutional neural network is based on location information of a partition boundary associated with a neighboring block, and at least one vector representing the location information of the partition boundary associated with the neighboring block is reduced in dimension for use in the convolutional neural network, and wherein the neighboring block is located above or to the left of the block of image data.

14. The apparatus of claim 13, wherein the location information of the partition boundary associated with the neighboring block is contained in a vector.

15. The apparatus of claim 4, wherein the at least one processor is further configured to:
  generate a residual based on the predicted plurality of smaller blocks; and
  include the residual in a bitstream.

16. The apparatus of claim 4, wherein the vector of split possibilities is a single-component vector.

17. The apparatus of claim 4, wherein the block of image data has a size of 64×64 pixels.

18. The method of claim 1, wherein the vector of split possibilities is a single-component vector.

19. The method of claim 1, wherein the block of image data has a size of 64×64 pixels.

\* \* \* \* \*